United States Patent [19]

Keller et al.

[11] Patent Number: 4,759,939
[45] Date of Patent: Jul. 26, 1988

[54] CONTINUOUS PRODUCTION OF PRETZELS

[75] Inventors: Lewis C. Keller, Watauga; Cecil A. Bowles, Lewisville, both of Tex.

[73] Assignee: Frito-Lay, Inc., Dallas, Tex.

[21] Appl. No.: 898,226

[22] Filed: Aug. 20, 1986

[51] Int. Cl.[4] .............................................. A23P 1/12
[52] U.S. Cl. .................................... 426/549; 426/514; 426/499
[58] Field of Search ................ 426/499, 19, 27, 143, 426/295, 439, 549, 500, 501, 505, 502, 514, 517, 516, 519, 512, 504, 551, 21, 447, 282; 425/323

[56] References Cited

U.S. PATENT DOCUMENTS

| | | | |
|---|---|---|---|
| 1,793,374 | 2/1931 | Reed | 425/323 |
| 2,248,291 | 8/1941 | Walborn | 426/503 |
| 3,203,370 | 8/1965 | Haug et al. | 366/85 |
| 3,306,751 | 2/1967 | Appleby | 426/439 |
| 3,615,675 | 10/1971 | Wisdom et al. | 99/83 |
| 3,876,815 | 4/1975 | Kurzius | 426/499 |
| 3,976,791 | 8/1976 | Seiberlich | 426/19 |
| 4,039,168 | 8/1977 | Carla et al. | 259/9 |
| 4,126,706 | 11/1978 | Hilton | 426/438 |
| 4,162,333 | 7/1979 | Nelson et al. | 426/283 |
| 4,241,649 | 12/1980 | Nelson et al. | 99/354 |
| 4,288,463 | 9/1981 | Groff et al. | 426/500 |

FOREIGN PATENT DOCUMENTS 165870 12/1985 European Pat. Off. .
2149637 6/1985 United Kingdom .

Primary Examiner—Donald E. Czaja
Assistant Examiner—Carolyn Paden
Attorney, Agent, or Firm—Bernard, Rothwell & Brown

[57] ABSTRACT

A continuous process for producing pretzels is disclosed in which an essentially dry mixture containing flour, corn syrup solids and salt is introduced into an extruder; water is injected into the extruder barrel to bring the water level of the mixture to between 19% and 25%; the material is extruded at non-cooking temperature to form a self-supporting ribbon of extrudate; the extrudate is sprayed with a caustic solution; and the sprayed extrudate is baked. The claimed process is adaptable to the continuous production of a filled pretzel product.

31 Claims, 1 Drawing Sheet

CONTINUOUS PRODUCTION OF PRETZELS

BACKGROUND OF THE INVENTION

1. Field of the Invention

This invention relates to methods for the continuous production of pretzel products. In particular, the invention relates to a method of producing pretzels on a continuous basis which employs relatively low moisture. In one embodiment, the invention relates to the continuous production of a pretzel product which is subsequently continuously filled with an edible material such as a creamy or paste-like material.

2. Prior Art

The making of pretzels is an art which has been practiced for many years. Pretzels are baked products which are produced from essentially rather simple recipes containing flour, water, salt and other ingredients. Pretzels have a characteristic flavor which is imparted by chemical reactions occurring during baking and by flavoring ingredients such as malt and yeasts. They are especially characterized by the presence of a darkly browned exterior surface. It has long been known that the browned surface effect can be obtained by coating the surface of the dough mixture, prior to baking, with a caustic solution such as 0.5% aqueous NaOH. Caustic treatment not only imparts the desired browning during the baking cycle, but also contributes to the development of characteristic pretzel flavors.

In the prior art, pretzels have been produced from dough mixtures containing relatively high water contents, i.e, about 40% to 50%. Since the final pretzel has a moisture content of only about 2.0%, this requires a considerably high energy input during the baking cycle in order to drive off water and achieve the desired final moisture content. The high moisture content of prior art pretzel doughs makes them relatively soft, so that they tend to lose their shape easily. This is particularly true during the caustic treatment where the pretzel dough tends to become very pliable. Consequently, it has beeen difficult to maintain a shaped dough profile, such as a tubular or C-shaped profile suitable for injection of filling materials, using uncooked pretzel doughs of the prior art. This has made it difficult or impossible to produce filled pretzel products in a continuous process.

U.S. Pat. Nos. 4,162,333 and 4,241,649 disclose a method for producing a filled pretzel product. In accordance with this method, short tubular pieces of pretzel dough are extruded onto supporting pegs on a conveyor belt. Extrusion is conducted in a discontinuous manner as the pegs on the conveyor belt are indexed past the extruder die. The supporting pegs are required to prevent the central cavity of the pretzel dough from losing its configuration, thereby ensuring a cavity of appropriate dimensions for receiving the filling material. The individual tubular pieces are subjected to a number of further processing steps, including baking and filling. In addition to being discontinuous in nature, the process is extremely cumbersome inasmuch as it requires complex material handling equipment to handle each small tubular piece of dough without allowing it to lose its tubular configuration.

U.S. Pat. No. 3,615,675 describes a process for continuously producing a filled, puff-extruded farinaceous product. In this process, a farinaceous mixture having a moisture content of 10% to 25% is extruded through an annular die at a temperature exceeding the boiling point of the moisture in the mixture so that the farinaceous material expands due to the flashoff of moisture upon emerging from the extruder. An edible, creamy or paste-like material is continuously deposited into the hollow core of the puff-extruded material by pumping the filling material through a filling tube which extends coaxially through the die orifice into the central core of the extrudate. In this process, the puffed extrudate sets up to form a dimensionally stable cylinder, susceptible of continuous processing, due to the flashoff of moisture upon emerging from the die. The puffed product which is produced has texture and flavor characteristics which are different from those of pretzels.

It is an object of the present invention to provide a method for producing pretzels in a continuous operation which enables the pretzels so produced to be continuously filled with an edible filling material.

It is a further object of this invention to provide a method for continuously producing pretzels which is energy efficient and which minimizes the amount of energy input required to dry the product to its final moisture content.

Other objects and advantages of the invention will be apparent to those skilled in the art from the following description.

SUMMARY OF THE INVENTION

The present invention provides a method for the continuous production of a pretzel product. The method of the invention employs a dough composition containing about one-half the moisture of a conventional pretzel dough composition so that the amount of energy required to reduce the product to its final moisture content in the baking oven is minimized. The dough is more self-supporting than conventional pretzel doughs of the prior art when formed into a shape such as tubular or C-shaped profile. The method of the invention involves the production of a self-supporting continuous ribbon of unbaked pretzel dough, whose cross-section can be of any desired shape, preferably a generally annular or C-shaped cross-section having a hollow core suitable for filling with an edible creamy or paste-like material. Because the dough ribbon produced in the process of the invention is more dimensionally stable than shaped pretzel doughs of the prior art, it maintains its cross-sectional configuration during subsequent baking and filling operations.

In accordance with the teachings of the invention, there is provided a method for the continuous production of a pretzel which is capable of being continuously filled, the method comprising introducing to the feed zone of an extruder a mixture comprising flour, corn syrup solids and salt, said mixture having a moisture content not greater than about 14%; injecting water into the mixture in the extruder barrel to raise its moisture content to between about 19% and 25%; mechanically mixing the ingredients in the extruder barrel through the action of the extruder screw(s) while maintaining the temperature of the mixture below about 140° F.; extruding the mixture through a die to form a continuous ribbon of extrudate; transporting the extrudate ribbon through a spray zone where it is sprayed with a caustic solution; and transporting the sprayed ribbon through an oven where it is baked to a final moisture content from about 1.0% to 3.0%. Optionally, after spraying with the caustic solution and before baking, the pretzel surface can be salted with pretzel salt.

In one embodiment, the invention provides a method for continuously producing a filled pretzel product. The extrudate, produced as described above, is produced by extrusion through a die having a generally C-shaped cross-section to produce an extrudate having a filling cavity running continuously along its length. An edible material, preferably having a creamy or paste-like texture, is continuously injected into the filling cavity either before or after baking, preferably after baking.

An essential feature of the method of the invention is the maintenance of relatively low temperature of the material in the extruder, i.e., below about 140° F. Accordingly, the extruder is not employed to partially or completely cook the pretzel dough, nor is it employed for the purpose of puffing the extrudate by causing moisture to flash off when the extrudate emerges from the die.

DETAILED DESCRIPTION OF THE PREFERRED EMBODIMENTS

Figure 1:
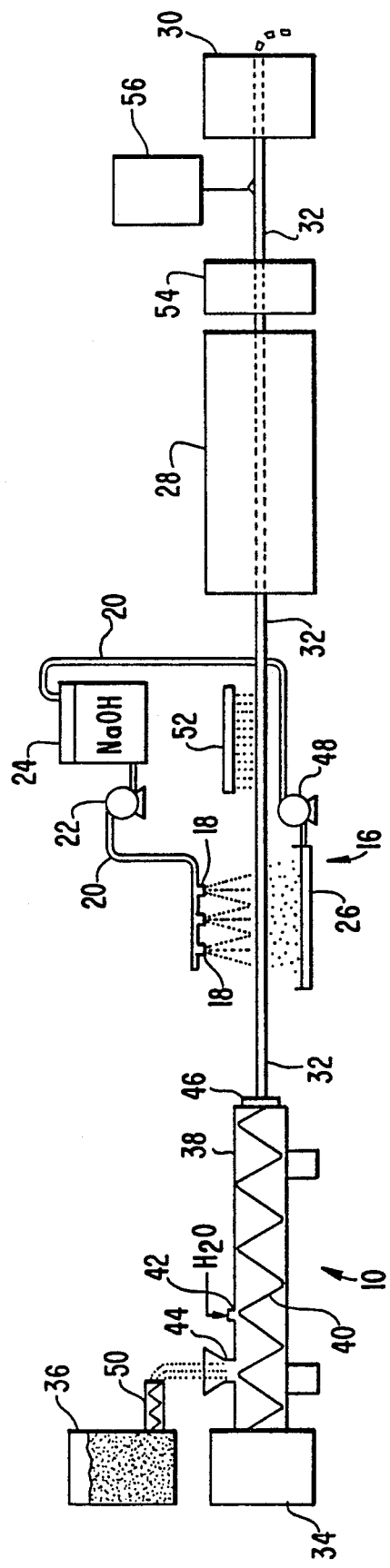
FIG. 1 is a schematic representation of a production line suitable for producing filled pretzels by the method of the invention.

In accordance with the practice of this invention, an essentially dry mixture of materials is provided to the feed zone of the extruder. By "essentially dry" is meant that no water other than the moisture inherently present under ambient conditions is added to the feed materials prior to introduction into the extruder. With the exception of added water, which is introduced once the materials are inside the extruder barrel, any materials which are conventionally employed in pretzel dough formulations can be employed in the feed mixture. The predominant ingredient in the feed mixture is flour, preferably wheat flour. Generally, the feed mixture contains from about 70% to 85% flour, preferably from about 73% to 85% flour. All percentages given herein are by weight, unless otherwise indicated.

The feed mixture also contains corn syrup solids. Corn syrup solids serve several functions in the dough mixture employed in the method of the invention. They enhance surface browning, which is highly desired in a pretzel product. Moreover, the corn syrup solids have a plasticizing effect on the mixture when exposed to the shearing action of the extruder screw(s), without which it would be difficult or impossible to extrude the mixture at the low moisture level employed. As those skilled in the art are aware, corn syrup solids are produced by dehydrating partially hydrolyzed corn starch (starch hydrolysates). Starch hydrolysates are generally classified on the basis of dextrose equivalence (D.E.) values. As used herein, the D.E. value refers to the reducing sugars content of the dissolved solids in starch hydrolysates, expressed as percent dextrose, as measured by the Luff-Schoorl method. The method is described in NBS circular C-40, page 195 as appearing in "Polarimetry, Saccharimetry and the Reducing Sugars" by Frederick J. Bates and Associates. Corn syrup solids are dehydrated corn starch hydrolysates having D.E. values greater than 20. We prefer to employ corn syrup solids having a D.E. value from about 34 to about 38. Typically, such corn syrup solids have a carbohydrate composition with about 7% monosaccharides, 32% disaccharides, 13% trisaccharides, and 48% tetrasaccharides or higher (dry basis). The feed mixture contains from about 9% to 15% corn syrup solids, preferably from 10.5% to 13.5%.

The feed mixture also contains salt. Salt contributes to the characteristic flavor of the pretzel and helps to develop dough elasticity. Salt is present in the feed mixture in an amount from about 0.5% to 1.5%, preferably from 0.6% to 1.2%.

Other additives which are conventionally present in pretzel dough formulations or which assist in extrusion can also be present in their usual effective amounts. Advantageously, a monoglyceride is present in the feed mixture in an amount from about 1.0% to 2.5%. Monoglycerides are monosubstituted fatty acid esters of glycerol in which the fatty acid moiety can be partially or completely saturated. They are usually employed in the food industry in the form of a steam-distilled fraction of vegetable oil containing at least 90% monoglyceride molecules. Monoglycerides which can be employed include, for example, Panalite 90 D (Paniplus, Inc., Olathe, Kansas). The monoglycerides act as a dough softener, if present in appropriate amounts. The monoglycerides can also act as extrusion aids to impart a smooth surface to the extrudate and ultimately to the finished product. Without such an extrusion aid, the extrudate tends to have a rough surface which is not consistent with the consumer's perception of a pretzel surface. It has also been found that the use of non-stick die surfaces such as Teflon® die surfaces, enhances product surface smoothness. These can be provided either by coating the die surfaces with Teflon® or by milling the die from a Teflon® block.

The feed mixture may also incorporate, as an extrusion aid, an oil or a fat. The fats or oils which can be used can be derived from animal or vegetable sources, with vegetable oils generally being preferred. The fat or oil, if present, is generally present in the feed mixture in an amount from about 1.0% to 4.0% thereof. If desired, the fat or oil, in a liquid state, can be metered into the extruder separately from the other feed mixture ingredients. In addition to acting as an extrusion aid, the fat or oil tends to prevent swelling, shape deformation, or bubble formation in the product during baking.

Other ingredients which optionally can be present in the feed mixture include, for example, conventional pretzel flavoring agents. Foremost among these are malt and yeast. Malt, in the form of liquid malt, is generally present in an amount from about 1.5% to 2.5% of the feed mixture. Alternatively, dry powdered malt can be used in an amount from about 1.0% to 2.0% of the feed mixture. Yeast, in the form of dry baker's yeast, is generally present in an amount from about 1.5% to 2.5% of the feed mixture.

As previously indicated, no water other than that inherently present in the ingredients is added to the feed mixture prior to feeding to the extruder. Consequently, the moisture content of the feed mixture provided to the extruder does not exceed about 14%.

The method of the invention can be understood with reference to the single FIGURE. FIG. 1 represents schematically a preferred embodiment of a production line suitable for the continuous production of filled pretzels by the method of the invention. The essentially dry mixture described above is provided to an extruder, indicated generally by 10, by feeding the mixture in preblended form from the extruder feeder hopper 36 into the extruder 10 by means of a metering screw 50 and feed port 44. Preferably, the feed mixture is fed to the extruder 10 at a rate such that the extruder screws 40 are maintained in a starved condition; that is, the feed rate is less than the maximum conveying capacity of the screws 40. To produce a uniform extrudate from the feed mixture, it is preferred to employ an extruder of the twin-screw variety. A twin-screw extruder is preferred because it provides a homogeneous extrudate having a uniform extrudate velocity which is important to the drying and continuous filling of the product. The extruder consists generally of two screws 40, one of which is shown in FIG. 1, which are disposed in parallel within an appropriately configured extruder barrel 38. The screws 40 are driven by a motor 34 through appropriate gears, thrust bearings, etc. (not shown). The extruder screws 40 co-rotate. The flights and shafts of the two screws 40 are disposed in relation to each other in such a way that when they are rotated in the same direction, they wipe each other clean of material being extruded. This type configuration is preferred over a single-screw configuration because soluble and insoluble proteins and carbohydrates present in the pretzel dough mixture could otherwise cause the material to stick to the screw, blocking the needed conveying action of a single-screw extruder. Advantageously, the extruder can be jacketed for the circulation of cooling water to control the temperature of the material in the extruder barrel. Extruders of the type described are widely commercially available. A suitable extruder for use in the practice of the invention is a Baker Perkins Model No. MPF-50D twin-screw extruder (Baker Perkins, Grand Rapids, Michigan). The configuration of the screws 40 is preferably such that they impart relatively low shear to the mixture in the extruder. Low-shear screw configurations are well known to those in the extrusion art. The screw configuration should be one which is conducive to thorough mixing of the ingredients in the mixture. The design of an appropriate screw configuration is well within the skill of those in the art without undue experimentation.

After the dry mixture has been introduced to the extruder 10 at feed port 44, the conveying action of the screws 40 causes the material to move forward in the direction of the extruder die 46. Immediately downstream of the feed port 44, water is injected into the material through an injection port 42. Water is injected at a rate which brings the water content of the material in the extruder barrel 38 to between about 19% and 25%, preferably 20% to 22%, based on the total weight of the material and included water. Additionally, oil may be metered into the barrel if it has not been premixed with the other dry ingredients.

As the material moves forward in the extruder barrel 38, the mixing action of the screws 40 causes the ingredients to be thoroughly admixed. An essential feature of the invention is the maintenance of noncooking conditions in the extruder 10. Cooking generally begins with starch gelatinization which occurs at temperatures exceeding about 150° F. Accordingly, the temperature of the mixture is maintained below about 140° F. This can be facilitated by the external application of cooling, as necessary. For example, cooling water can be circulated in jackets around the extruder barrel. The circulation of cooling water can be regulated using conventional temperature sensing and control equipment to maintain the desired material temperature in the barrel.

The mixture emerges from the extruder 10 through a die 46 to form a continuous ribbon 32 of extrudate. The configuration of the die orifice can be selected to provide any desired cross-sectional configuration to the ribbon 32. Generally, a round cross-section or, in the case of a pretzel which is to be filled, an annular or generally C-shaped cross-section, will be preferred. If desired, the die 46 may contain several adjacent orifices to form parallel ribbons 32 of extrudate. Due to the relatively low moisture content of the extrudate, it forms a ribbon 32 which is self-supporting. The ribbon 32 can be assisted in its forward movement by conventional takeoff devices (not shown).

The ribbon 32 of extrudate is passed through a spraying station, indicated generally by 16, where it is sprayed with caustic solution. The caustic solution is preferably an aqueous solution of from about 0.4% to 1.5% NaOH, most preferably 0.5% aqueous NaOH. The caustic solution is applied at a temperature from about 180° F. to 200° F. The spray station has a supply tank 24 equipped with temperature control means, from which the caustic solution is drawn by means of a pump 22 through piping 20 and thence through spray nozzles 18 located so as to spray the top and sides of the moving ribbon 32 of extrudate. A collector 26 located below the moving ribbon 32 collects the caustic runoff and recycles it to the tank 24 by means of a pump 48. A sufficient amount of caustic solution is sprayed to completely coat the outer surfaces of the ribbon 32.

In the embodiment shown in FIG. 1, following the spraying station 16, the ribbon is salted with pretzel salt at a salting station 52. Conventional seasoning distribution equipment, such as a vibrating pan, can be used to apply the pretzel salt at the salting station 52. The ribbon 32 is next transported to an oven 28.

Typically, the oven temperature is from 450° F. to 550° F. The residence time in the oven 28 is such that the product is cooked to a final moisture content of from about 1.0% to 3.0%, preferably from 1.5% to 2.5%, and the desired surface browning effects are achieved.

The baked ribbon 32 of pretzel dough is then cooled at a cooling station 54, where it is cooled by conventional means such as by blowing cool air across its surfaces.

In the embodiment of the invention shown, the extrudate is produced in an annular or generally C-shaped configuration by extrusion through an appropriately configured die. There is thus created a ribbon 32 which has a central cavity running axially therethrough. An edible material, preferably an edible creamy or paste-like material is employed to fill the cavity, e.g., cheese paste, sugar starch paste, peanut butter, etc. The edible material can be continuously injected into the cavity of the moving ribbon 32 of baked pretzel product at a filling station 56 by means of conventional filling nozzles, metering pumps or manifolds (not shown). Injection of filling material is indicated schematically by means of an arrow. The baked and filled ribbon is then passed to a cutting station 30, where it is cut into pieces of desired length using conventional cutting equipment.

Alternatively, a filled pretzel product may be formed by injecting the edible filling material into the cavity of the moving ribbon of extrudate prior to baking. However, this requires that the filling material be thermostable at the baking temperatures employed. For example, the filling material can be introduced continuously into the hollow core of the unbaked extrudate by pumping it through a filling tube that extends through the extruder die 46 coaxially into the hollow core of the extrudate. A suitable filling tube and die arrangement for accomplishing this is described, for example, in U.S. Pat. No. 3,615,675.

The following example is intended to illustrate further the practice of the invention and is not intended to limit its scope in any way.

EXAMPLE

The following ingredients were dry blended:

| Ingredient | Parts by Weight |
|---|---|
| Pretzel flour | 79.40 |
| Salt | 1.00 |
| Monoglycerides (Panalite 90 D) | 1.30 |
| Corn Syrup Solids (Maltrin M365, D.E. 36) | 12.25 |
| Soybean oil (75° F. melt) | 2.00 |
| Liquid malt | 2.00 |
| Dry yeast | 2.00 |

The dry blended ingredients were fed to the feed port of a Baker Perkins Model No. MPF-50D twin-screw extruder equipped with low-shear screws. The extruder had the following screw configuration, proceeding from the inlet of the barrel towards the die:
(1) a 10" long metering screw;
(2) a 3¼" long 30° forward paddle section;
(3) a 3" long single lead screw;
(4) a 2" long 60° forward paddle section;
(5) a 6" long lead screw;
(6) a 2" long 60° forward paddle section;
(7) a 3" long single lead screw.

The extruder was equipped with a water injection port about 3 in. downstream of the material feed port. The extruder die contained 2 C-shaped orifices arranged in a horizontal row with the openings of the "C's" at the top. The extruder was operated at a screw speed of 70 rpm to achieve a throughput of approximately 100 lb/hr. Water was injected through the injection port at a rate of 8.4 lb/hr. The temperature in the extruder barrel just prior to discharge achieved a steady state at approximately 104° F. The material exiting the extruder was uncooked, had a moisture content of 20.6% and formed self-supporting C-shaped ribbons capable of being baked and filled continuously in downstream processing steps.

What is claimed is:

1. A method for continuous production of a pretzel which comprises: introducing to the feed zone of an extruder an essentially dry mixture comprising 70 to about 85% flour, 9 to about 15% corn syrup solids, said corn syrup solids having a D.E. value between 34 and 38, and 0.5 to about 1.5% salt; injecting water into the mixture in the extruder barrel to raise the moisture content of said dry mixture to between 19% and 25%; mixing the ingredients in the extruder barrel while maintaining the temperature of the mixture below about 140° F.; extruding the mixture through a die to form a continuous ribbon of extrudate; transporting the extrudate ribbon through a spray zone where it is sprayed with a caustic solution; and transporting the sprayed ribbon through an oven where it is baked to a final moisture content between about 1.0% and 3.0%.

2. A method as claimed in claim 1, wherein the extruder is a co-rotating twin-screw extruder.

3. A method as claimed in claim 1, wherein water is injected into the mixture in the extruder barrel to raise its moisture content to between 20% and 22%.

4. A method as claimed in claim 1, wherein the extrudate ribbon is baked to a final moisture content from about 1.5% to 2.5%.

5. A method as claimed in claim 1, wherein the mixture that is introduced into the feed zone of the extruder also contains a monoglyceride.

6. A method as claimed in claim 5, wherein the mixture comprises from about 1.0% to 2.5% monoglycerides.

7. A method as claimed in claim 1, wherein the mixture that is introduced into the feed zone of the extruder also contains an edible oil.

8. A method as claimed in claim 7, wherein the edible oil is a vegetable oil.

9. A method as claimed in claim 7, wherein the mixture comprises from 1.0% to 4.0% of the edible oil.

10. A method as claimed in claim 1, wherein the mixture that is introduced to the feed zone of the extruder comprises from 73% to 85% flour; from 10.5% to 13.5% corn syrup solids; and from 0.5% to 1.5% salt.

11. A method as claimed in claim 1, wherein the mixture further comprises from 1.5% to 2.5% malt.

12. A method as claimed in claim 1, wherein the mixture further comprises from 1.5% to 2.5% yeast.

13. A method as claimed in claim 1, wherein the extrudate ribbon is salted with pretzel salt after being sprayed with caustic solution and prior to baking.

14. A method as claimed in claim 1, wherein the caustic solution contains from 0.4% to 1.5% NaOH and is applied to the extrudate at a temperature of from about 180° F. to 200° F.

15. A method as claimed in claim 1, wherein the mixture which is fed to the extruder has a moisture content not greater than 14%.

16. A method for continuous production of a filled pretzel which comprises; introducing to the feed zone of an extruder an essentially dry mixture comprising 70 to 85% flour, 9 to about 15% corn syrup solids, said corn syrup solids having a D.E. value between 34 and 38, and 0.5 to about 1.5% salt; injecting water into the mixture in the extruder barrel to raise the moisture content of said mixture to between 19% and 25%; mixing the ingredients in the extruder barrel while maintaining the temperature of the mixture below about 140° F.; extruding through a die to form a continuous ribbon of extrudate having a central cavity running axially therethrough; transporting the extrudate ribbon through an oven where it is baked to a final moisture content between about 1.0% and 3.0%; and continuously injecting an edible filling material into the cavity.

17. A method as claimed in claim 16, wherein the extrudate has a generally C-shaped cross-section.

18. A method as claimed in claim 16, wherein the extruder is a co-rotating twin-screw extruder.

19. A method as claimed in claim 16, wherein water is injected into the mixture in the extruder barrel to raise its moisture content to between 20% and 22%.

20. A method as claimed in claim 16, wherein the extrudate ribbon is baked to a final moisture content from about 1.5% to 2.5%.

21. A method as claimed in claim 16, wherein the mixture that is introduced into the feed zone of the extruder also contains a monoglyceride.

22. A method as claimed in claim 21, wherein the mixture comprises from about 1.0% to 2.5% monoglycerides.

23. A method as claimed in claim 16, wherein the mixture that is introduced into the feed zone of the extruder also contains an edible oil.

24. A method as claimed in claim 23, wherein the edible oil is a vegetable oil.

25. A method as claimed in claim 23, wherein the mixture comprises from 1.0% to 4.0% of the edible oil.

26. A method as claimed in claim 16, wherein the mixture that is introduced to the feed zone of the extruder comprises from 73% to 85% flour; from 10.5% to 13.5% corn syrup solids; and from 0.5% to 1.5% salt.

27. A method as claimed in claim 16, wherein the mixture further comprises from 1.5% to 2.5% malt.

28. A method as claimed in claim 16, wherein the mixture further comprises from 1.5% to 2.5% yeast.

29. A method as claimed in claim 16, wherein the extrudate ribbon is salted with pretzel salt after being sprayed with caustic solution and prior to baking.

30. A method as claimed in claim 16, wherein the caustic solution contains from 0.4% to 1.5% NaOH and is applied to the extrudate at a temperature of from about 180° F. to 200° F.

31. A method as claimed in claim 16, wherein the mixture which is fed to the extruder has a moisture content not greater than 14%.

* * * * *